US010754154B2

(12) United States Patent
Kasazumi et al.

(10) Patent No.: US 10,754,154 B2
(45) Date of Patent: Aug. 25, 2020

(54) DISPLAY DEVICE AND MOVING BODY HAVING DISPLAY DEVICE

(71) Applicant: Panasonic Intellectual Property Management Co., Ltd., Osaka (JP)

(72) Inventors: Ken'ichi Kasazumi, Osaka (JP); Toshiya Mori, Osaka (JP); Kosuke Kubota, Osaka (JP); Masahito Ogata, Osaka (JP); Masanaga Tsuji, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/576,908

(22) Filed: Sep. 20, 2019

(65) Prior Publication Data

US 2020/0012103 A1    Jan. 9, 2020

Related U.S. Application Data

(63) Continuation of application No. PCT/JP2018/001864, filed on Jan. 23, 2018.

(30) Foreign Application Priority Data

Mar. 31, 2017 (JP) .................................. 2017-072709

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *G02B 7/1822* (2013.01);
(Continued)

(58) Field of Classification Search
CPC combination set(s) only.
See application file for complete search history.

(56) References Cited

U.S. PATENT DOCUMENTS

2010/0066832 A1   3/2010   Nagahara et al.
2010/0157430 A1   6/2010   Hotta et al.
(Continued)

FOREIGN PATENT DOCUMENTS

JP         1-293239      11/1989
JP      2006-142897       6/2006
(Continued)

OTHER PUBLICATIONS

International Search Report of PCT application No. PCT/JP2018/001864 dated Apr. 24, 2018.
(Continued)

*Primary Examiner* — Deeprose Subedi
(74) *Attorney, Agent, or Firm* — Greenblum & Bernstein, P.L.C.

(57) ABSTRACT

A display device includes an image forming unit, a projection unit, a main body, and a position correcting unit. The image forming unit includes a display surface and forms an image on the display surface. The projection unit projects a virtual image corresponding to an image on a target space by using output light from the image forming unit. The main body is equipped with an image forming unit and a projection unit. The position correcting unit changes a display position of a virtual image relative to the main body on the basis of an orientation signal representing an orientation of the main body. The position correcting unit includes a plurality of correcting units that change a display position of a virtual image by using different means. The position correcting unit selects at least one correcting unit from a plurality of correcting units in accordance with a frequency component of an orientation signal, and causes the selected correcting unit to change a display position of a virtual image.

10 Claims, 11 Drawing Sheets

(51) Int. Cl.
  *G02B 27/18* (2006.01)
  *G02B 7/182* (2006.01)
  *G03B 21/14* (2006.01)

(52) U.S. Cl.
  CPC ............ *G02B 27/18* (2013.01); *G03B 21/142* (2013.01); *G02B 2027/014* (2013.01); *G02B 2027/0196* (2013.01); *G02B 2027/0198* (2013.01)

(56) References Cited

U.S. PATENT DOCUMENTS

| | | | |
|---|---|---|---|
| 2012/0050138 A1 | 3/2012 | Sato et al. | |
| 2016/0288645 A1* | 10/2016 | Popham | B60W 50/14 |
| 2017/0254659 A1 | 9/2017 | Fukumoto | |
| 2019/0139286 A1* | 5/2019 | Shimoda | G02B 27/0101 |

FOREIGN PATENT DOCUMENTS

| | | |
|---|---|---|
| JP | 2010-070066 | 4/2010 |
| JP | 2010-256878 | 11/2010 |
| JP | 2017-003946 | 1/2017 |
| JP | 2017-013590 | 1/2017 |
| WO | 2009/095246 | 8/2009 |
| WO | 2018/042898 A1 | 3/2018 |

OTHER PUBLICATIONS

German Office Action dated May 11, 2020 for the related German Patent Application No. 112018001655.2.

\* cited by examiner

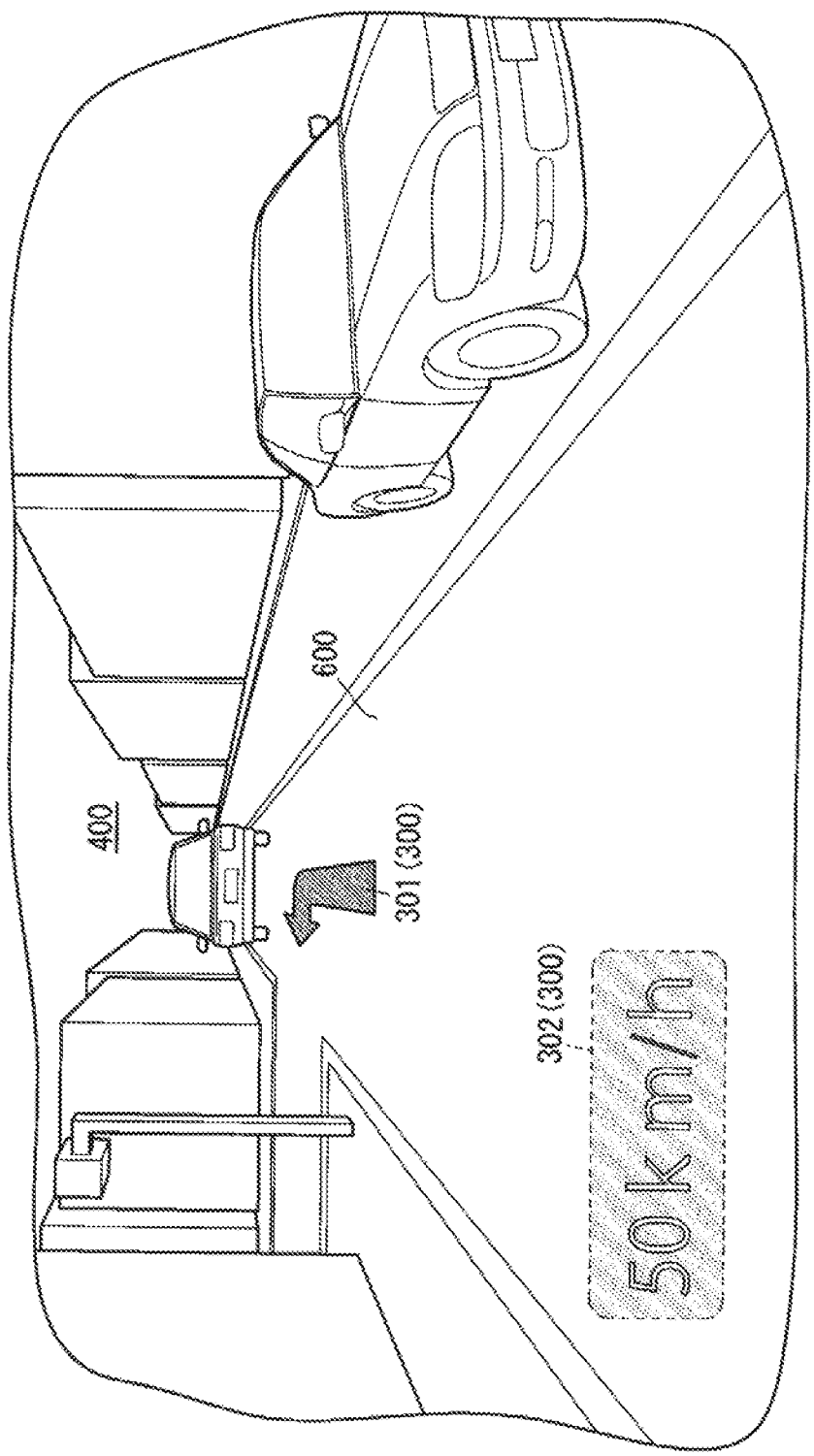

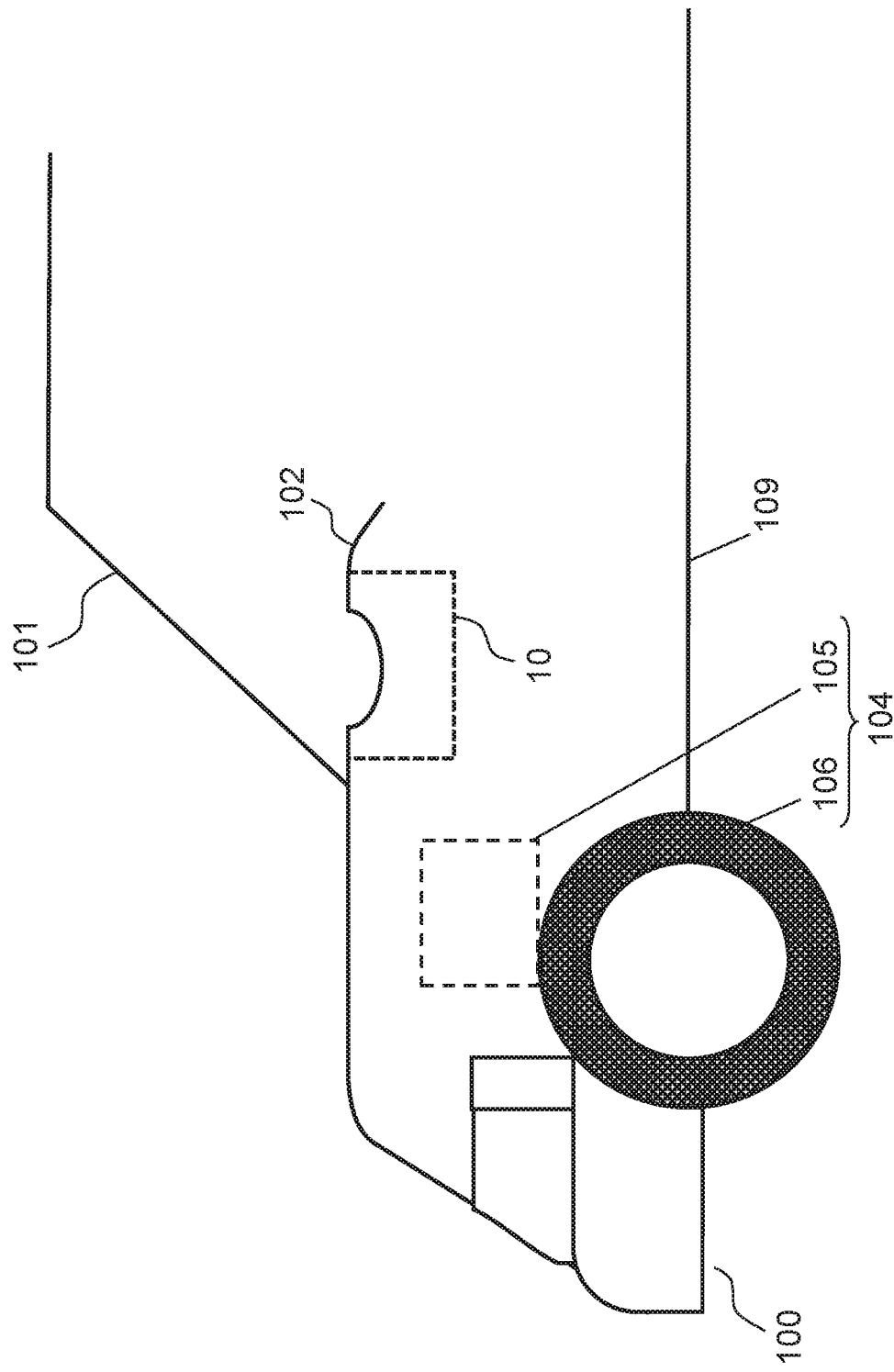

DISPLAY DEVICE AND MOVING BODY HAVING DISPLAY DEVICE

CROSS-REFERENCE TO RELATED APPLICATIONS

This application is a continuation of the PCT International Application No. PCT/JP2018/001864 filed on Jan. 23, 2018, which claims the benefit of foreign priority of Japanese patent application No. 2017-072709 filed on Mar. 31, 2017, the contents all of which are incorporated herein by reference.

TECHNICAL FIELD

The present disclosure generally relates to a display device and a moving body having the display device and, more particularly, to a display device for projecting a virtual image on a target space and a moving body having the display device.

BACKGROUND ART

Conventionally, there has been known, as a vehicle display device, a head-up display device that superimposes and displays an information image from an image forming unit (image display) into a visual field of a driver (see, for example, PTL 1).

A display device disclosed in PTL 1 is configured to cause light generated by a display surface of an image forming unit to enter a windshield (window member) through a projection lens and guide the light from the display surface to a driver by causing the windshield to reflect the light. The display device disclosed in PTL 1 includes means for detecting a vibration state of a vehicle and a driving device that drives a projection lens, and changes a superimposition position of an image (virtual image) within a visual field of a driver by displacing the projection lens in accordance with a direction of vibration displacement. PTL 1 discloses a technique of reducing vibrations of a virtual image due to vibrations of a vehicle equipped with a display device.

CITATION LIST

Patent Literature

PTL 1: Unexamined Japanese Patent Publication No. 1-293239

SUMMARY OF THE INVENTION

The present disclosure provides a display device that can adjust a display position of a virtual image in accordance with various vibrations exerted on the display device and a moving body having the display device.

A display device according to a first aspect includes an image forming unit, a projection unit, a main body unit, and a position correcting unit. The image forming unit includes a display surface and forms an image on the display surface. The projection unit projects a virtual image corresponding to an image on a target space by using output light from the image forming unit. The main body unit is equipped with an image forming unit and a projection unit. The position correcting unit changes a display position of a virtual image relative to the main body unit on the basis of an orientation signal representing an orientation of the main body unit. The position correcting unit includes a plurality of correcting units that change a display position of a virtual image by using different means. The position correcting unit is configured to select at least one correcting unit from the plurality of correcting units in accordance with a frequency component of an orientation signal and causes the selected correcting unit to change a display position of a virtual image.

In a display device according to a second aspect, the plurality of correcting units in the first aspect include an image correcting unit configured to change a display position of a virtual image by changing a position of an image on a display surface.

In a display device according to a third aspect, the position correcting unit in the second aspect is configured to select at least the image correcting unit with respect to a frequency component of the orientation signal which is more than or equal to a predetermined lower limit frequency.

In a display device according to a fourth aspect, the projection unit in any one of the first to third aspects includes an optical element configured to project a virtual image on the target space by reflecting or transmitting output light from the image forming unit. The plurality of correcting units include an element correcting unit configured to change a display position of a virtual image by changing a direction or position of an optical element.

In a display device according to a fifth aspect, the position correcting unit in the fourth aspect is configured to select at least an element correcting unit with respect to a frequency component of an orientation signal which is less than or equal to a predetermined upper limit frequency.

In a display device according to a sixth aspect, the plurality of correcting units in any one of the first to fifth aspects each include a display surface correcting unit configured to change the display position of the virtual image by changing a position of a display surface.

In a display device according to a seventh aspect, the position correcting unit in the sixth aspect is configured to select at least the display surface correcting unit with respect to a frequency component of an orientation signal which is less than or equal to a predetermined upper limit frequency.

In a display device according to an eighth aspect, the plurality of correcting units in any one of the first to seventh aspects each include a first correcting unit and a second correcting unit. The position correcting unit further includes a first filter and a second filter. An orientation signal is input to the first correcting unit via the first filter. An orientation signal is input to the second correcting unit via the second filter.

A moving body according to a ninth aspect includes a display device according to any one of claims 1 to 8 and a reflecting member configured to reflect light from a projection unit.

The present disclosure has an advantage of being capable of adjusting a display position of a virtual image in accordance with various vibrations exerted on a display device.

BRIEF DESCRIPTION OF DRAWINGS

FIG. 3 is a schematic view showing a visual field of a user when the above display device is used.

FIG. 11 is a conceptual diagram of an automobile having the display device according to the first exemplary embodiment.

DESCRIPTION OF EMBODIMENT

Prior to describing an exemplary embodiment according to the present disclosure, disadvantages of the conventional technique will briefly be described. The display device disclosed in PTL 1 adjusts a display position of a virtual image within a visual field of a driver by using a single means (for example, driving the projection lens) regardless of frequency components of vibrations exerted on the display device (vibrations of a vehicle). Accordingly, for example, when various vibrations are exerted on the display device due to road surface conditions, acceleration and deceleration of the vehicle, and the like, vibrations of a virtual image may not be reduced only by adjusting a display position of the virtual image depending on a type of vibrations. When, for example, a means for adjusting a display position of a virtual image corresponds to vibrations having a relatively small amplitude and a relatively high frequency, vibrations of a virtual image which have a relatively large amplitude and a relatively low frequency sometimes cannot be reduced.

First Exemplary Embodiment (1) Outline

Figure 1:
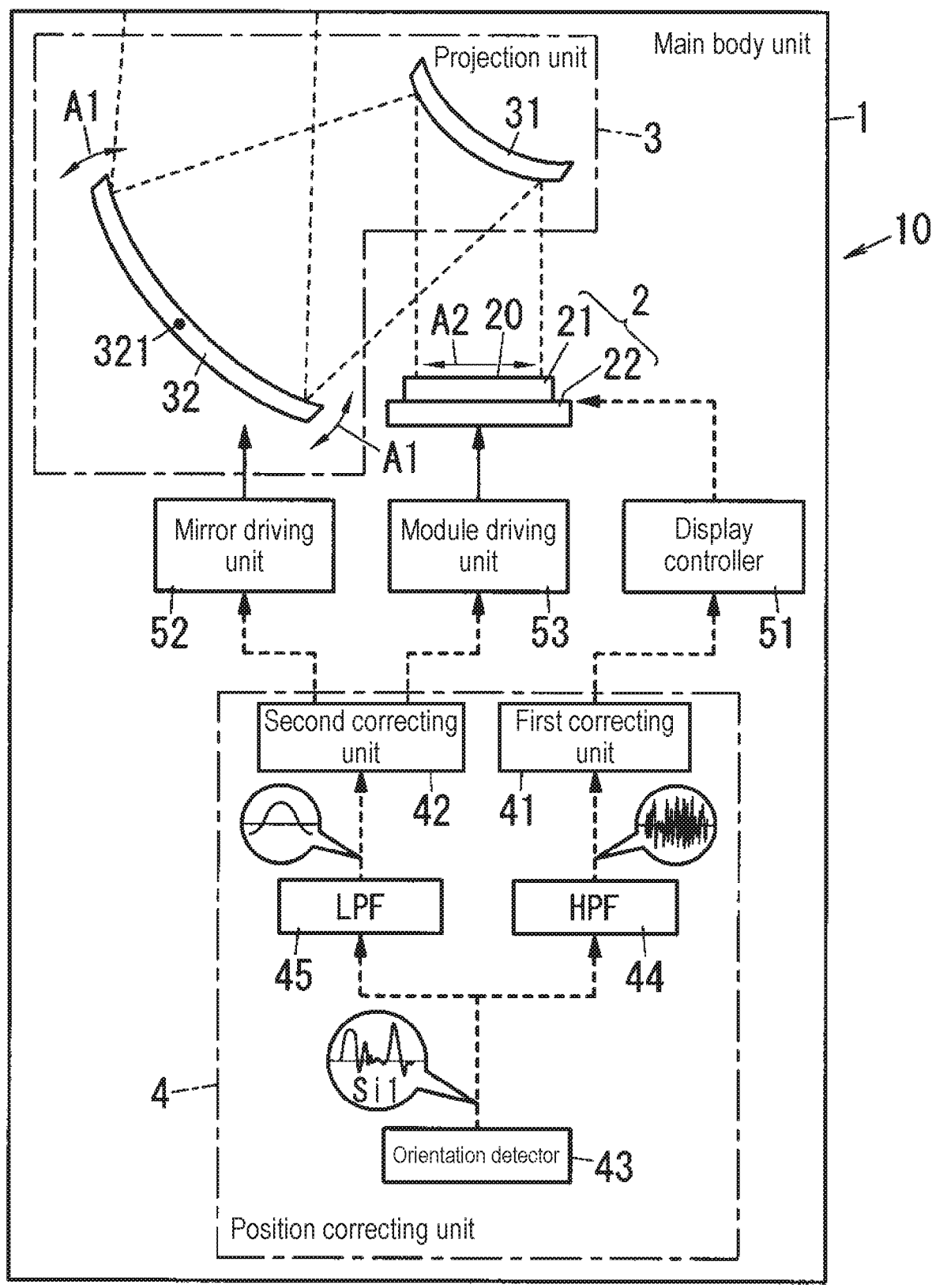
FIG. 1 is a conceptual diagram showing a configuration of a display device according to a first exemplary embodiment.
Figure 2:
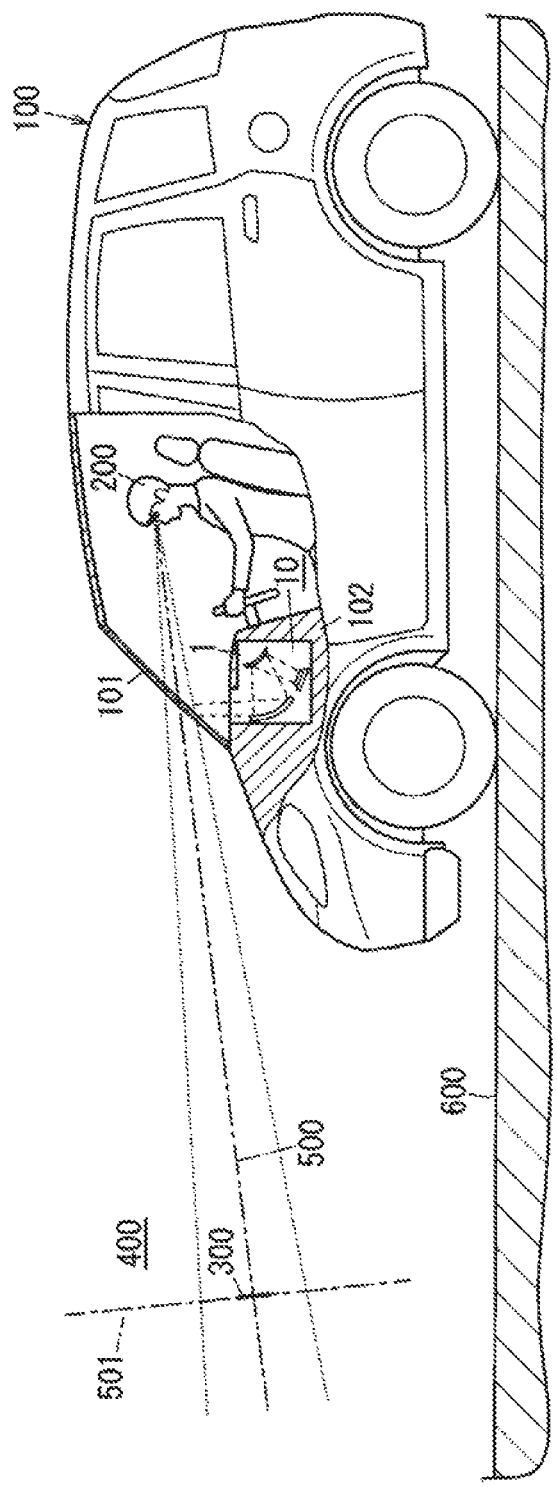
FIG. 2 is a conceptual diagram of an automobile having the above display device.

Display device 10 according to the first exemplary embodiment is, for example, a head-up display (HUD) used for automobile 100 as a moving body, as shown in FIGS. 1, 2, and 11.

As shown in FIG. 11, automobile 100 includes automobile main body unit 109, automobile driving unit 104 that moves the automobile main body unit 109, windshield 101 fixed to automobile main body unit 109, and display device 10 disposed in dashboard 102 of automobile main body unit 109. Automobile driving unit 104 includes drive source 105 such as an engine or motor and drive wheel 106 driven by drive source 105.

As shown in FIG. 1, display device 10 is installed in an interior of automobile 100 so as to project an image on windshield 101 of automobile 100 from below. In a case of FIG. 2, display device 10 is disposed in dashboard 102 below windshield 101. When display device 10 projects an image on windshield 101, user 200 (driver) visually recognizes an image reflected by windshield 101 as a reflecting member.

Display device 10 makes user 200 visually recognize, through windshield 101, virtual images 300 projected on target space 400 set in front of (outside) automobile 100. In this case, "virtual image" indicates an image formed by divergent rays of light, which are formed when light emitting from display device 10 is diverged by a reflecting object such as windshield 101, so as to appear as if an actual object were present. This allows user 200 driving automobile 100 to see virtual images 300 projected by display device 10 so as be superimposed on a real space spreading in front of automobile 100, as shown in FIG. 3. Accordingly, display device 10 can display, as virtual images 300, various types of driving assistance information such as vehicle speed information, navigation information, pedestrian information, front vehicle information, lane departure information, and vehicle condition information, and then allows user 200 to visually recognize the displayed information. This enables user 200 to visually acquire driving assistance information only by slightly moving his or her line of sight directed to a front of windshield 101.

In display device 10 according to the first exemplary embodiment, virtual images 300 formed in target space 400 include two types of virtual images such as at least first virtual image 301 and second virtual image 302. In this case, the "first virtual image" is, for example, navigation information indicating a traveling direction of automobile 100, and can present, for example, an arrow indicating a right turn or left turn on road surface 600. First virtual image 301 of this type is an image displayed by using an augmented reality (AR) technique, and is superimposed and displayed at a specific position in an actual scenery (road surface 600, buildings, neighboring vehicles, pedestrians, and the like) viewed by user 200. Second virtual image 302 is, for example, vehicle speed information, and can, for example, present a current running speed (vehicle speed) of automobile 100. In a case of FIG. 3, first virtual image 301 represents, for example, an arrow indicating a "left turn" on a T-junction road in front of automobile 100. Second virtual image 302 displays, for example, information "50 km/h".

Display device 10 forms virtual images 300, formed in target space 400, on virtual plane 501 intersecting with optical axis 500 of display device 10. In the first exemplary embodiment, optical axis 500 extends along road surface 600 in front of automobile 100 in target space 400 in front of automobile 100. Virtual plane 501 on which virtual images 300 are formed is almost vertical to road surface 600. For example, when road surface 600 is a horizontal plane, virtual image 300 are displayed along a vertical plane.

In this case, display device 10 according to the first exemplary embodiment includes image forming unit 2, projection unit 3, and main body unit 1. Image forming unit 2 includes display surface 20 and forms image 700 on display surface 20 (see FIG. 7). Projection unit 3 projects virtual images 300 corresponding to image 700 on target space 400 by using output light from image forming unit 2. Main body unit 1 is equipped with image forming unit 2 and projection unit 3. While main body unit 1 is mounted in automobile 100, an orientation of main body unit 1 changes together with an orientation of automobile 100 due to, for example, a condition of road surface 600 and acceleration or deceleration of automobile 100. More specifically, when, for example, automobile 100 is set in a front inclined orientation due to deceleration of automobile 100, main body unit 1 is also set in a front inclined orientation. When automobile 100 is set in a rear inclined orientation due to acceleration of automobile 100, for example, main body unit 1 is also set in a rear inclined orientation. When the orientation of main body unit 1 of display device 10 changes, a position of each virtual image 300 projected by display device 10 also changes in target space 400. For this reason, for example, when automobile 100 is set in a front inclined orientation or rear inclined orientation, first virtual image 301 is sometimes superimposed and displayed at a position shifted from a specific position where first virtual image 301 should be superimposed and displayed in an actual scenery viewed from user 200.

Display device 10 according to the first exemplary embodiment further includes position correcting unit 4 for correcting a display position of each virtual image 300. Position correcting unit 4 changes the display position of virtual image 300 relative to main body unit 1 on the basis of orientation signal Si1 representing an orientation of main body unit 1. In this case, position correcting unit 4 includes a plurality (two in the case of FIG. 1) of correcting units (41, 42). The plurality of correcting units (41, 42) change the display position of virtual image 300 by using different means. Position correcting unit 4 selects at least one correcting unit from the plurality of correcting units (41, 42) in accordance with a frequency component of orientation signal Si1, and changes the display position of virtual image 300 by using the selected correcting unit.

This adjusts the display position of each virtual image 300 in accordance with an orientation of main body unit 1. Accordingly, even when, for example, automobile 100 is set in the front inclined orientation or rear inclined orientation, display device 10 can superimpose and display first virtual image 301 at a specific position where the image should be superimposed in an actual scenery when viewed from user 200. Display device 10 according to the first exemplary embodiment selectively uses the plurality of correcting units (41, 42) that change the display position of virtual image 300 by using different means in accordance with a frequency component of orientation signal Si1. Even if, therefore, various vibrations are exerted on main body unit 1 of display device 10 due to a condition of road surface 600, acceleration and deceleration of automobile 100, and the like, it is possible to change the display position of virtual image 300 by using a correcting unit (41, 42) suitable for a type (frequency component) of vibrations. Accordingly, display device 10 has an advantage of being capable of adjusting the display position of virtual image 300 in accordance with various vibrations exerted on display device 10.

(2) Configuration

Display device 10 according to the first exemplary embodiment includes main body unit 1, image forming unit 2, projection unit 3, and position correcting unit 4, as shown in FIG. 1. Display device 10 further includes display controller 51, mirror driving unit 52, and module driving unit 53.

Main body unit 1 is formed from, for example, one housing. Accommodating image forming unit 2 and projection unit 3 in main body unit 1 will mount image forming unit 2 and projection unit 3 on main body unit 1. In the first exemplary embodiment, constituent elements (position correcting unit 4, display controller 51, mirror driving unit 52, and module driving unit 53) other than image forming unit 2 and projection unit 3 are also mounted (accommodated) in main body unit 1. Main body unit 1 is fixed in dashboard 102 of automobile 100. Note, however, that constituent elements (position correcting unit 4, display controller 51, mirror driving unit 52, and module driving unit 53) other than image forming unit 2 and projection unit 3 may not be mounted in main body unit 1. In addition, main body unit 1 may be constituted by a plurality of housings or need not be a housing. For example, main body unit 1 may be a frame or plate member.

Figure 7:
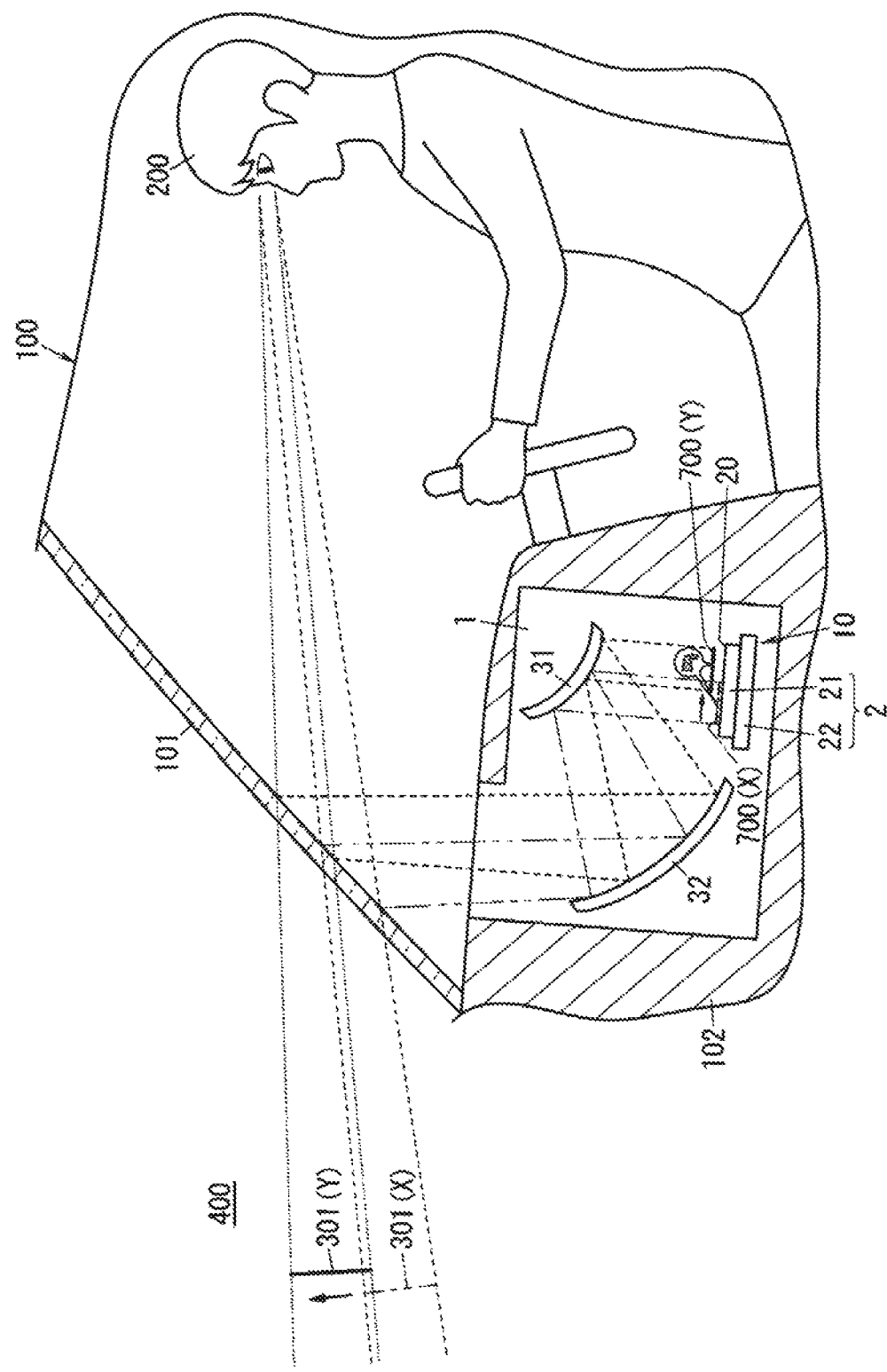
FIG. 7 is a conceptual diagram showing an operation of a first correcting unit in the above display device.

Image forming unit 2 includes display surface 20 and forms image 700 on display surface 20 (see FIG. 7). In the first exemplary embodiment, for example, image forming unit 2 includes liquid crystal panel 21 (LCD: Liquid Crystal Display) and light source device 22, as shown in FIG. 1. Liquid crystal panel 21 is disposed in front of light source device 22. A front surface (a surface on an opposite side to light source device 22) of liquid crystal panel 21 is formed from display surface 20. Light source device 22 is used as a backlight of liquid crystal panel 21. Light from light source device 22 is transmitted through liquid crystal panel 21 and output from image forming unit 2. Light source device 22 is a surface light source that irradiates an almost entire area of a back surface of liquid crystal panel 21 by using a slid-state light-emitting element such as a light-emitting diode or laser diode.

While image forming unit 2 displays an image on liquid crystal panel 21, when light source device 22 emits light, the light output forward from light source device 22 is transmitted through liquid crystal panel 21 and output forward from the front surface (display surface 20) of liquid crystal panel 21. In this case, light output forward from display surface 20 is light reflecting an image displayed on liquid crystal panel 21. When display surface 20 is viewed from front, it looks as if image 700 were displayed on display surface 20, and hence image 700 is formed on display surface 20.

In this case, a longitudinal direction of display surface 20 coincides with a longitudinal direction of image 700, and a transverse direction of display surface 20 coincides with a transverse direction of image 700. The longitudinal direction of projected image 700 coincides with a longitudinal direction of each virtual image 300 (see FIG. 2) projected on target space 400 (see FIG. 2), that is, a direction along a vertical direction within the visual field of user 200 (see FIG. 2). The transverse direction of projected image 700 coincides with a transverse direction of virtual image 300 projected on target space 400, that is, a direction along a horizontal direction within the visual field of user 200.

Projection unit 3 projects virtual images 300 corresponding to image 700 on target space 400 by using output light from image forming unit 2. According to the first exemplary embodiment, as described above, display device 10 is a head-up display configured to project an image on windshield 101 (see FIG. 2). Accordingly, projection unit 3 projects an image on a target object formed from windshield 101.

In the first exemplary embodiment, for example, projection unit 3 includes first mirror 31 and second mirror 32, as shown in FIG. 1. First mirror 31 and second mirror 32 are arranged in this order named on an optical path of light output from image forming unit 2. First mirror 31 and second mirror 32 are optical element. Projection unit 3 projects each virtual image 300 on target space 400 by reflecting output light from image forming unit 2 using these optical elements. In the first exemplary embodiment, image forming unit 2, first mirror 31, and second mirror 32 are arranged at vertex positions of a triangle formed within a vertical plane. In this case, the "vertical plane" is a plane including a longitudinal direction (vertical direction) of an image formed by image forming unit 2 and a traveling direction (optical axis) of output light. Projection unit 3 causes first mirror 31 to reflect output light from image forming unit 2 and further causes second mirror 32 to reflect the light to make the light emit to a target object (windshield 101).

That is, first mirror 31 is disposed on an opposite side to light source device 22 when viewed from liquid crystal panel 21, that is, in front of liquid crystal panel 21, so as to make output light from image forming unit 2 enter first mirror 31. First mirror 31 reflects output light from image forming unit 2 toward second mirror 32. Second mirror 32 is disposed at a position where output light from image forming unit 2 which is reflected by first mirror 31 enters second mirror 32. Second mirror 32 reflects output light from image forming unit 2, which is reflected by first mirror 31, toward a target object (windshield 101). In the first exemplary embodiment, first mirror 31 is a convex mirror, and second mirror 32 is a concave mirror.

As described above, projection unit 3 projects image 700 (see FIG. 7) formed on display surface 20 of image forming unit 2, as a projection image in an appropriate size, on a target object (windshield 101), thereby projecting each virtual image 300 (see FIG. 2) on target space 400 (see FIG. 2). That is, user 200 driving automobile 100 can see virtual image 300 projected by display device 10, within the visual field of user 200, upon superimposition of virtual image 300 on a real space spreading in front of automobile 100.

Display controller 51 controls image forming unit 2 (liquid crystal panel 21 and light source device 22). Display controller 51 is formed from, for example, a microcomputer including a central processing unit (CPU) and a memory as main components. In other words, display controller 51 is implemented by a computer including a CPU and a memory. The CPU executes a program stored in the memory to cause the computer to function as display controller 51. Although the program is recorded in advance in a memory of display controller 51 in this case, the program may be provided via an electric communication line such as the Internet or provided by being recorded on a recording medium such as a memory card.

Display controller 51 forms arbitrary image 700 on display surface 20 by controlling image forming unit 2. That is, display controller 51 can cause liquid crystal panel 21 to display (draw) an arbitrary video content by performing software processing, thereby forming arbitrary image 700 on display surface 20. When, for example, virtual images 300 (first virtual image 301 and second virtual image 302) like those shown in FIG. 3 are projected on target space 400, display controller 51 determines a content (a direction, position, and the like of an arrow) of first virtual image 301 and a content (vehicle speed and the like) of second virtual image 302. In addition, display controller 51 determines a position of image 700 on a front surface of liquid crystal panel 21, that is, display surface 20. In summary, display controller 51 can, for example, display image 700 corresponding to first virtual image 301 on an upper half of display surface 20 or a lower half of display surface 20. As a position of an image on display surface 20 changes, a display position of each virtual image 300 relative to main body unit 1 changes.

Mirror driving unit 52 moves an optical element included in projection unit 3. That is, mirror driving unit 52 changes a direction or position of the optical element. In the first exemplary embodiment, a target to be driven by mirror driving unit 52 is second mirror 32. Mirror driving unit 52 changes the direction of second mirror 32 by rotating second mirror 32. Accordingly, a direction of light reflected by second mirror 32 changes in accordance with a rotation angle (deflection angle) of second mirror 32, and a display position of each virtual image 300 relative to main body unit 1 changes. In this case, mirror driving unit 52 changes the display position of virtual image 300 projected on target space 400 in a longitudinal direction by rotating at least second mirror 32, in a direction of arrow A1 in FIG. 1, about rotation axis 321 along a transverse direction of display surface 20. Mirror driving unit 52 is formed from, for example, an electrically-driven actuator such as a motor.

Module driving unit 53 moves image forming unit 2. That is, module driving unit 53 physically changes a position or direction of display surface 20. In the first exemplary embodiment, targets to be driven by module driving unit 53 are liquid crystal panel 21 and light source device 22. Module driving unit 53 changes the position of display surface 20 by rectilinearly moving image forming unit 2. Accordingly, the position of image 700 relative to main body unit 1 changes in accordance with a movement amount of display surface 20, and the display position of each virtual image 300 relative to main body unit 1 changes. In this case, module driving unit 53 changes the display position of virtual image 300 projected on target space 400 in the longitudinal direction by at least rectilinearly moving image forming unit 2 in a direction of arrow A2 in FIG. 1 along the longitudinal direction of display surface 20. Module driving unit 53 is formed from, for example, an electrically driven actuator such as a voice coil motor.

Position correcting unit 4 includes a plurality of correcting units (first correcting unit 41 and second correcting unit 42), orientation detector 43, high-pass filter 44 (written as "HPF" in FIG. 1), and low-pass filter 45 (written as "LPF" in FIG. 1). Position correcting unit 4 changes the display position of virtual image 300 relative to main body unit 1 on the basis of orientation signal Si1 representing an orientation of main body unit 1. This enables display device 10 to correct the display position of each virtual image 300 when an orientation of main body unit 1 changes. For example, display device 10 can superimpose and display first virtual image 301 at a specific position where the image should be superimposed in an actual scenery viewed from a viewpoint of user 200.

Position correcting unit 4 is formed from, for example, a microcomputer including a CPU and a memory as main components. In this case, high-pass filter 44 and low-pass filter 45 are formed from digital filters. However, high-pass filter 44 and low-pass filter 45 are formed from analog filters. At least some functions (for example, first correcting unit 41 and second correcting unit 42) of position correcting unit 4 may share single microcomputer with display controller 51.

Orientation detector 43 detects the orientation of main body unit 1 by acquiring orientation information representing an orientation of automobile 100 (automobile body) from an electronic control unit (ECU) mounted in automobile 100. That is, because main body unit 1 is fixed to dashboard 102, the orientation of main body unit 1 coordinates with the orientation of automobile 100 (automobile body), and it is possible to detect the orientation of main body unit 1 from orientation information of automobile 100. Orientation detector 43 outputs orientation signal Si1 representing the orientation of main body unit 1 upon detecting the orientation of main body unit 1. Orientation signal Si1 is a signal whose instantaneous value represents at least a tilt amount (for example, an angle) of automobile 100 relative to a horizontal plane in a pitching direction. In this case, "pitching" indicates rotation about an axis extending through automobile 100 in a horizontal direction centered on a center of gravity of automobile 100, that is, rotation leading to the front inclined orientation or rear inclined orientation.

When, for example, automobile 100 is set in the rear inclined orientation at the time of acceleration of automobile 100 to tilt by 5° (elevation angle of 5°) with respect to a horizontal plane, the instantaneous value of orientation signal Si1 becomes a value corresponding to "5". In contrast, when automobile 100 is set in the front inclined orientation at the time of deceleration of automobile 100 to tilt by 5° (depression angle of 5°) with respect to a horizontal plane, the instantaneous value of orientation signal Si1 becomes a value corresponding to "−5". The orientation of automobile 100 with no tilt in the pitching direction relative to a horizontal plane will be referred to as a "reference orientation". At this time, the instantaneous value of orientation signal Si1 becomes a value corresponding to "0". Accordingly, while vibrations are exerted on automobile 100 in the pitching direction, an amplitude of orientation signal Si1 corresponds to an amplitude of vibrations of automobile 100, and a frequency of orientation signal Si1 corresponds to a frequency (number) of vibrations of automobile 100.

High-pass filter 44 is configured to receive orientation signal Si1 from orientation detector 43 and passes only a high-frequency component of orientation signal Si1. In this case, the "high-frequency component" is a frequency component more than or equal to a predetermined lower limit frequency (cutoff frequency) of high-pass filter 44. That is, a frequency component (high-frequency component) more than or equal to the lower limit frequency of orientation signal Si1 passes through high-pass filter 44, and a frequency component less than the lower limit frequency is reduced by high-pass filter 44.

Low-pass filter 45 is configured to receive orientation signal Si1 from orientation detector 43 and passes only a low-frequency component of orientation signal Si1. In this case, the "low-frequency component" is a frequency component less than or equal to a predetermined upper limit frequency (cutoff frequency) of low-pass filter 45. That is, a frequency component (low-frequency component) less than or equal to the upper limit frequency of orientation signal Si1 passes through low-pass filter 45, and a frequency component exceeding the upper limit frequency is reduced by low-pass filter 45.

In this case, position correcting unit 4 is configured such that orientation signal Si1 is input to first correcting unit 41 via high-pass filter 44 as a first filter, and orientation signal Si1 is input to second correcting unit 42 via low-pass filter 45 as a second filter. That is, first correcting unit 41 is connected to an output of high-pass filter 44, and second correcting unit 42 is connected to an output of low-pass filter 45.

With this configuration, position correcting unit 4 selects at least one correcting unit from a plurality of correcting units (first correcting unit 41 and second correcting unit 42) in accordance with a frequency component of orientation signal Si1, and the selected correcting unit changes the display position of each virtual image 300. Position correcting unit 4 selects at least first correcting unit 41 (image correcting unit) with respect to a frequency component of orientation signal Si1 which is more than or equal to a predetermined lower limit frequency. In addition, position correcting unit 4 selects at least second correcting unit 42 (an element correcting unit or display surface correcting unit) with respect to a frequency component of orientation signal Si1 which is less than or equal to a predetermined upper limit frequency.

In the first exemplary embodiment, for example, a cutoff frequency (lower limit frequency) of high-pass filter 44 is almost equal to a cutoff frequency (upper limit frequency) of low-pass filter 45. However, this is not exhaustive, and the cutoff frequency (lower limit frequency) of high-pass filter 44 may be different from the cutoff frequency (upper limit frequency) of low-pass filter 45.

A plurality of correcting units (first correcting unit 41 and second correcting unit 42) change the display position of each virtual image 300 by using different means. That is, although first correcting unit 41 and second correcting unit 42 each have a function for changing the display position of virtual image 300, first correcting unit 41 and second correcting unit 42 use different means (methods) for changing the display position of virtual image 300.

In the first exemplary embodiment, first correcting unit 41 controls display controller 51. That is, first correcting unit 41 functions as an image correcting unit that changes the display position of each virtual image 300 by changing the position of image 700 on display surface 20. More specifically, first correcting unit 41 controls display controller 51 in accordance with an output from high-pass filter 44, that is, a high-frequency component of orientation signal Si1. In this case, first correcting unit 41 controls display controller 51 with respect to at least first virtual image 301 to change the position of image 700 on display surface 20 so as to absorb (reduce) a change in the position of virtual image 300 in target space 400 due to a change in the orientation of main body unit 1. This makes it possible to cope with vibrations, of vibrations of automobile 100, which have a high-frequency component, by adjusting the display position of virtual image 300 relative to main body unit 1 by using first correcting unit 41.

Second correcting unit 42 controls mirror driving unit 52 and module driving unit 53. That is, second correcting unit 42 functions as an element correcting unit that changes the display position of each virtual image 300 by causing mirror driving unit 52 to control to change a direction or position of an optical element (second mirror 32). In addition, second correcting unit 42 functions as a display surface correcting unit that changes the display position of virtual image 300 by changing the position of display surface 20 by controlling module driving unit 53. More specifically, second correcting unit 42 controls at least one of mirror driving unit 52 and module driving unit 53 in accordance with an output from low-pass filter 45, that is, a low-frequency component of orientation signal Si1. In this case, second correcting unit 42 changes a direction of second mirror 32 by controlling mirror driving unit 52 so as to absorb (reduce) a change in the position of virtual image 300 in target space 400 due to a change in the orientation of main body unit 1 with respect to both first virtual image 301 and second virtual image 302. Alternatively, second correcting unit 42 changes the position of display surface 20 by controlling module driving unit 53 so as to absorb (reduce) a change in the position of virtual image 300 in target space 400 due to a change in the orientation of main body unit 1 with respect to both first virtual image 301 and second virtual image 302. Accordingly, it is possible to cope with vibrations, of vibrations of automobile 100, which have a low-frequency component, by adjusting the display position of virtual image 300 relative to main body unit 1 by using second correcting unit 42.

(3) Operation

An operation of display device 10 described above will be described next.

(3.1) Basic Operation of Position Correcting Unit

A basic operation of position correcting unit 4 will be described first with reference to FIGS. 4A to 6B. In the following description, assume that vibrations having a relatively small amplitude and a relatively high frequency are exerted on automobile 100.

Figure 4A:
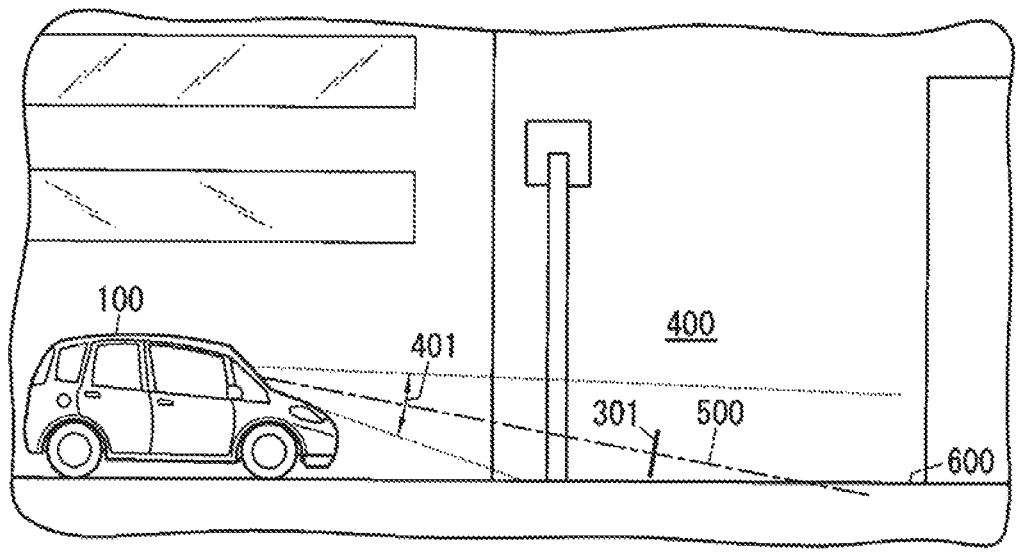
FIG. 4A is a schematic view when an automobile in a reference orientation is viewed from a side.
Figure 4B:
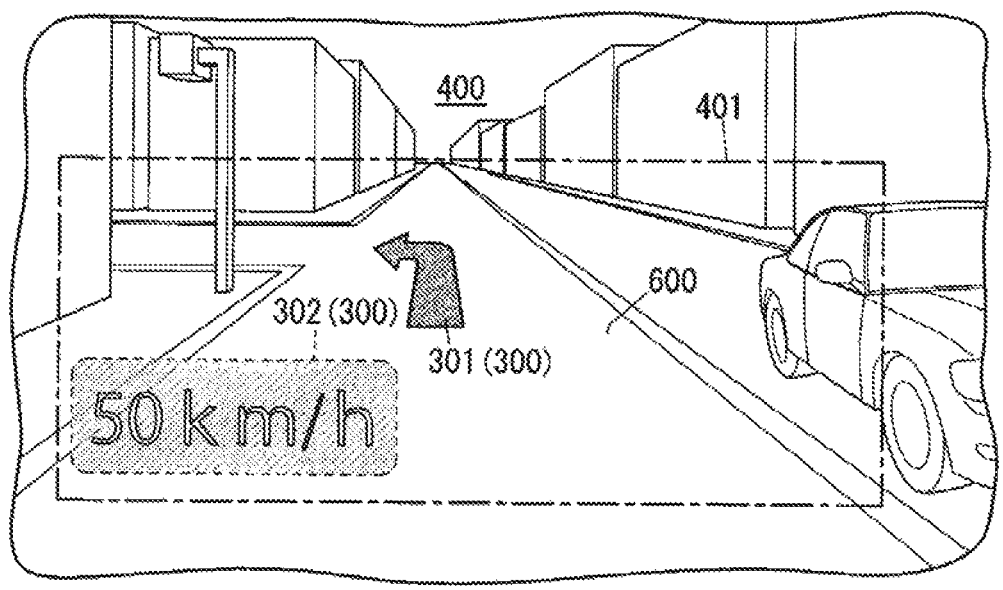
FIG. 4B is a conceptual diagram showing the visual field of the user driving the automobile in the reference orientation.
Figure 5A:
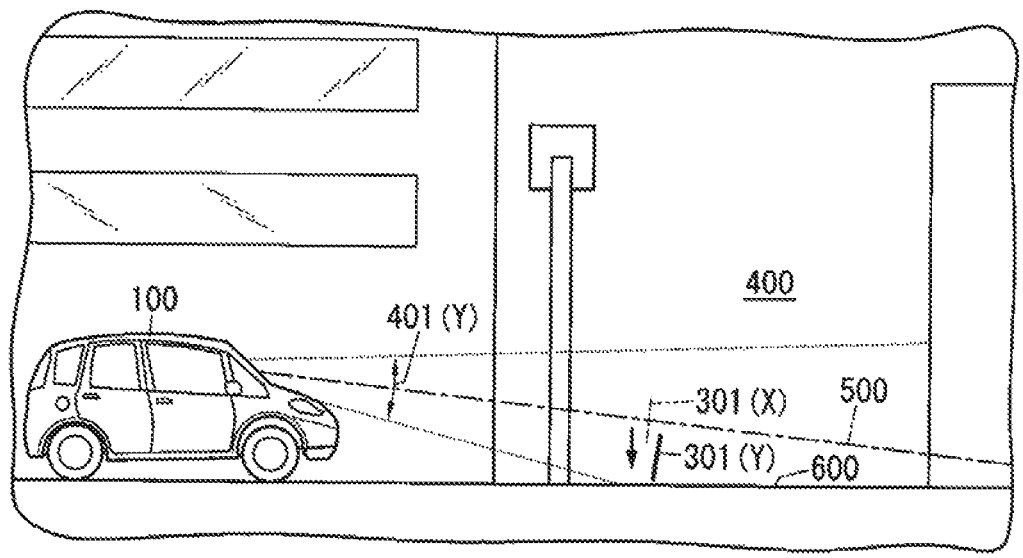
FIG. 5A is a schematic view when the automobile in a backward inclined orientation is viewed from a side.
Figure 5B:
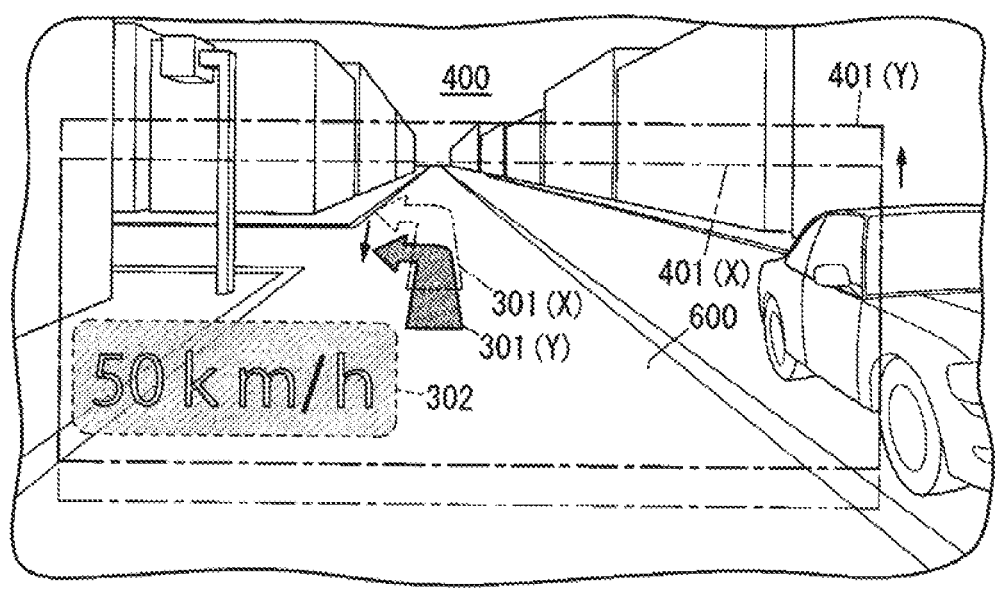
FIG. 5B is a conceptual diagram showing the visual field of the user driving the automobile in the backward inclined orientation.
Figure 6A:
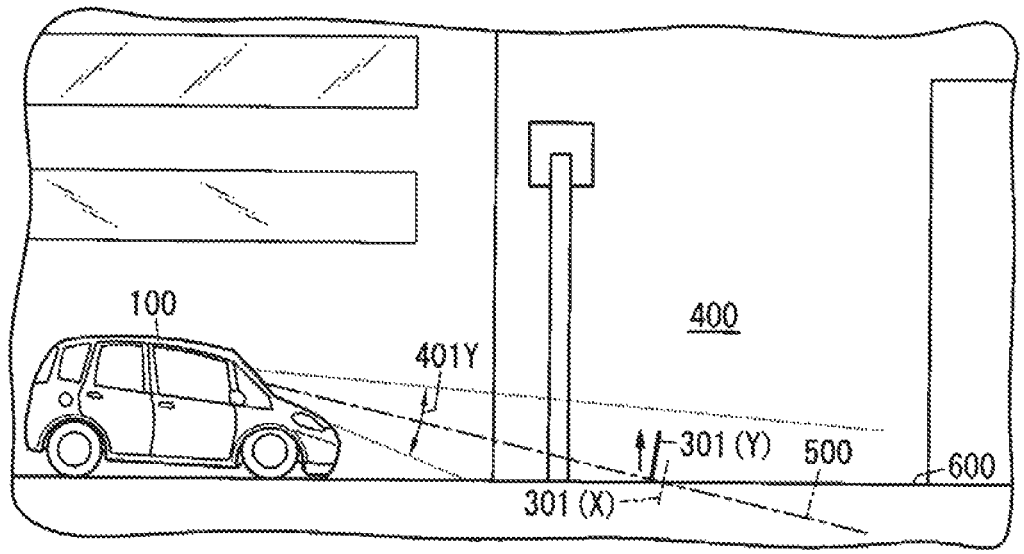
FIG. 6A is a schematic view when the automobile in a forward inclined orientation is viewed from a side.
Figure 6B:
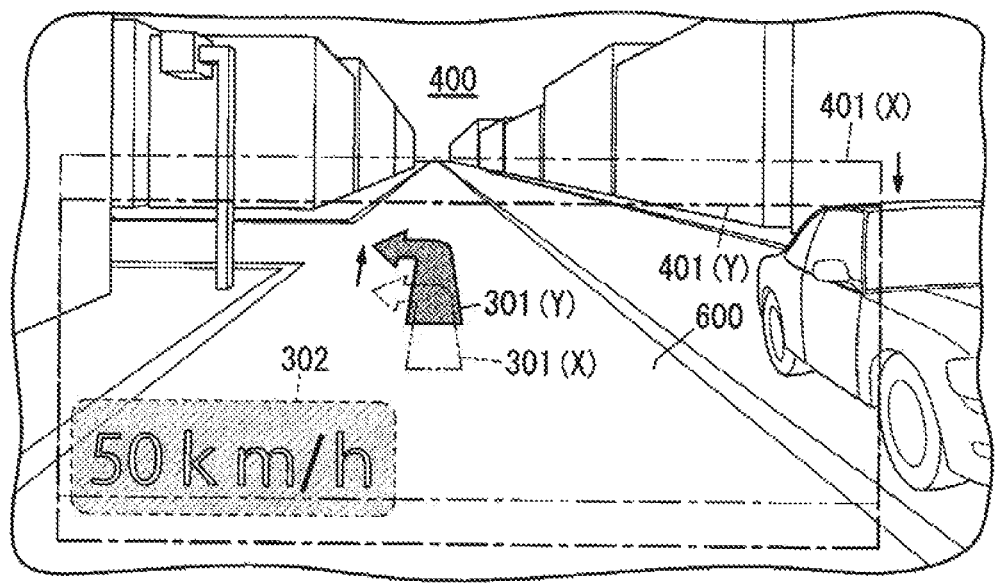
FIG. 6B is a conceptual diagram showing the visual field of the user driving the automobile in the forward inclined orientation.

FIGS. 4A, 5A, and 6A are schematic views when running automobile 100 is viewed from a side. FIGS. 4B, 5B, and 6B are conceptual diagrams respectively corresponding to FIGS. 4A, 5A, and 6A and showing a visual field of user 200. Referring to FIGS. 5A and 5B, it is assumed that automobile 100 is set in the rear inclined orientation in a pitching direction, that is, a height of a front portion of automobile 100 from road surface 600 becomes high as compared with the reference orientation shown in FIGS. 4A and 4B. Referring to FIGS. 6A and 6B, it is assumed that automobile 100 is set in the front inclined orientation in the pitching direction, that is, the height of the front portion of automobile 100 from road surface 600 becomes low as compared with the reference orientation shown in FIGS. 4A and 4B.

FIGS. 4A to 6B each show, as display area 401, an area, in target space 400, into which each virtual image 300 corresponding to image 700 formed on display surface 20 can be projected. FIGS. 4A, 5A, and 6A each show only first virtual image 301, of virtual images 300 projected on target space 400, with an illustration of second virtual image 302 being omitted. Referring to FIGS. 5A to 6B, display area 401 and first virtual image 301 have moved. Accordingly, "X" is suffixed to each of reference numerals denoting display area 401 and first virtual image 301 before the movement, and "Y" is suffixed to each of reference numerals denoting display area 401 and first virtual image 301 after the movement, thereby discriminating the display area and the first virtual image before the movement from those after the movement. In addition, referring to FIGS. 5A and 6A, first virtual image 301(X) before the movement and first virtual image 301(Y) after the movement are shifted from each other in a depth direction along optical axis 500 so as to be easily discriminated from each other. In practice, however, first virtual image 301 (X) and first virtual image 301(Y) undergo no change in position in the depth direction.

As shown in FIGS. 4A and 4B, while automobile 100 is set in the reference orientation, position correcting unit 4 displays virtual image 300 at a default display position without changing the display position of virtual image 300 (first virtual image 301) relative to main body unit 1. In this case, the default display position of first virtual image 301 is at an almost central portion of display area 401, that is, a position through which optical axis 500 (see FIG. 4A) passes. In this case, first virtual image 301 represents an arrow indicating "left turn" at a T-junction road in front of automobile 100. That is, in the visual field of user 200, first virtual image 301 is superimposed and displayed on the T-junction road in the actual scenery in display area 401. In addition, second virtual image 302 is displayed at a left lower corner position in display area 401 (see FIG. 4B).

As shown in FIGS. 5A and 5B, while automobile 100 is set in the rear inclined orientation, position correcting unit 4 changes the display position of virtual image 300 (first virtual image 301) relative to main body unit 1 from the default display position. That is, in this state, as shown in FIG. 5B, in the visual field of user 200, display area 401(X) moves upward, and display area 401(Y) is formed at a position shifted upward from display area 401. With this operation, at the default display position, first virtual image 301(X) is displayed at an almost central portion of display area 401(Y), and hence first virtual image 301(X) is superimposed and displayed at a position shifted forward from the T-junction road in the actual scenery in the visual field of user 200.

In this case, position correcting unit 4 causes first correcting unit 41 to change the display position of virtual image 300 by changing the position of image 700 on display surface 20. Details of correction by first correcting unit 41 will be described in "(3.2) Operation of first correcting unit". Accordingly, as shown in FIG. 5A, the display position of first virtual image 301(X) relative to main body unit 1 moves downward, and first virtual image 301(Y) is displayed at a position shifted downward from first virtual image 301(X) in display area 401(Y). As a result, as shown in FIG. 5B, in the visual field of user 200, first virtual image 301(Y) is superimposed and displayed at the T-junction road in the actual scenery in display area 401(Y). In addition, second virtual image 302 is displayed at a left lower corner position in display area 401(Y) (see FIG. 5B).

As shown in FIGS. 6A and 6B, while automobile 100 is set in the front inclined orientation, position correcting unit 4 changes the display position of virtual image 300 (first virtual image 301) relative to main body unit 1 from the default display position. That is, in this state, as shown in FIG. 6B, display area 401(X) moves downward, and display area 401(Y) is formed at a position shifted downward from display area 401 in the visual field of user 200. With this operation, at the default display position, first virtual image 301(X) is displayed at an almost central portion of display area 401(Y), and hence first virtual image 301(X) is superimposed and displayed at a position shifted backward from the T-junction road in the actual scenery in the visual field of user 200.

In this case, position correcting unit 4 causes first correcting unit 41 to change the display position of virtual image 300 by changing the position of image 700 on display surface 20. As a result, as shown in FIG. 6A, the display position of first virtual image 301(X) relative to main body unit 1 moves upward, and first virtual image 301(Y) is displayed at a position shifted upward from first virtual image 301(X) in display area 401(Y). As a result, in the visual field of user 200, as shown in FIG. 6B, first virtual image 301(Y) is superimposed and displayed at the T-junction road in the actual scenery in display area 401(Y). In addition, second virtual image 302 is displayed at a left lower corner position in display area 401(Y) (see FIG. 6B).

As described above, for example, with respect to vibrations having a high-frequency component of automobile 100, position correcting unit 4 causes first correcting unit 41 to reduce a change in the position of virtual image 300 in target space 400 due to a change in the orientation of main body unit 1 by changing the position of image 700 on display surface 20. In the first exemplary embodiment, first correcting unit 41 changes the display position of only first virtual image 301 of first virtual image 301 and second virtual image 302 relative to main body unit 1, and hence the position of second virtual image 302 changes in target space 400 as the orientation of main body unit 1 changes.

In this case, it is assumed that vibrations having a relatively small amplitude and a relatively high frequency are exerted on automobile 100. However, other types of vibrations may be exerted on automobile 100. For example, when vibrations having a relatively large amplitude and a relatively low frequency are exerted on automobile 100, position correcting unit 4 causes second correcting unit 42 to change the display position of virtual image 300. In addition, when vibrations including both a high-frequency component and a low-frequency component are exerted on automobile 100, position correcting unit 4 causes both first correcting unit 41 and second correcting unit 42 as a combination to change the display position of virtual image 300.

(3.2) Operation of First Correcting Unit

An operation of first correcting unit 41 will be described next with reference to FIG. 7. Referring to FIG. 7, because image 700 and first virtual image 301 have moved, "X" is suffixed to each of reference numerals denoting image 700 and first virtual image 301 before the movement, and "Y" is suffixed to each of reference numerals denoting image 700 and first virtual image 301 after the movement, thereby discriminating the image and the first virtual image before the movement from those after the movement. In addition, referring to FIG. 7, image 700(X) before the movement and image 700(Y) after the movement are shifted from each other in a depth direction perpendicular to display surface 20 so as to be easily discriminated from each other. Likewise, referring to FIG. 7, first virtual image 301(X) before the movement and first virtual image 301(Y) after the movement are shifted from each other in a depth direction along optical axis 500 (see FIG. 2) so as to be easily discriminated from each other. In practice, however, image 700(X) and image 700(Y) undergo no change in position in the depth direction, and first virtual image 301 (X) and first virtual image 301(Y) undergo no change in position in the depth direction.

As shown in FIG. 7, while image 700(X) is formed on display surface 20, first virtual image 301(X) corresponding to image 700(X) is projected on target space 400. First correcting unit 41 controls display controller 51 to move the position of image 700(X) on display surface 20 and form image 700(Y) at a position shifted from image 700(X) on display surface 20 in a longitudinal direction of display surface 20. With this operation, first virtual image 301(Y) is projected on target space 400 in correspondence with image 700(Y). As a result, the display position of first virtual image 301(X) relative to main body unit 1 moves upward, and first virtual image 301(Y) is displayed at a position shifted upward from first virtual image 301(X) in target space 400.

First correcting unit 41 can move the display position of first virtual image 301(X) in a direction opposite to that in the case shown in FIG. 7 (that is, downward) by moving the position of image 700(X) on display surface 20 in a direction opposite to that in FIG. 7.

As described above, first correcting unit 41 causes display controller 51 to change the position of image 700 on display surface 20, and hence can respond to a change in the orientation of main body unit 1 at a relatively high speed, and can adjust the display position of virtual image 300 so as to follow up vibrations having a high-frequency component. That is, first correcting unit 41 can adjust the display position of virtual image 300 so as to reduce an influence of vibrations having a relatively small amplitude and a relatively high frequency.

First correcting unit 41 changes the display position of virtual image 300 relative to main body unit 1 by changing the position of image 700 on display surface 20. Accordingly, as described above, first correcting unit 41 can change the display position of only first virtual image 301 of first virtual image 301 and second virtual image 302, relative to main body unit 1. First correcting unit 41 may change the display position of at least one of first virtual image 301 and second virtual image 302 relative to main body unit 1. For example, first correcting unit 41 may change the display positions of both first virtual image 301 and second virtual image 302 relative to main body unit 1. In this case, it is possible to reduce changes in the positions of first virtual image 301 and second virtual image 302 in target space 400 due to a change in the orientation of main body unit 1.

(3.3) Operation of Second Correcting Unit

Figure 8:
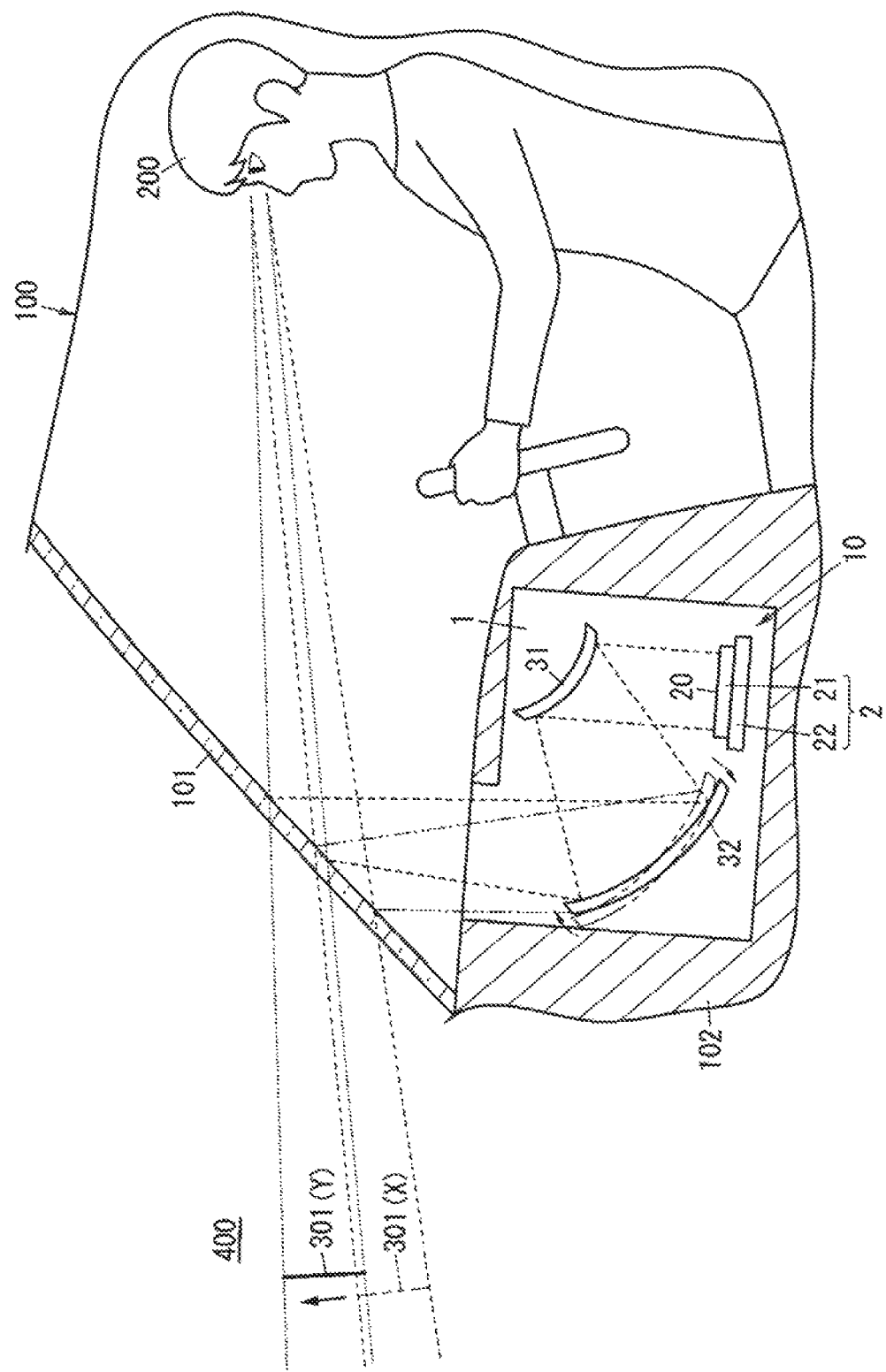
FIG. 8 is a conceptual diagram showing an operation of a second correcting unit in the above display device.
Figure 9:
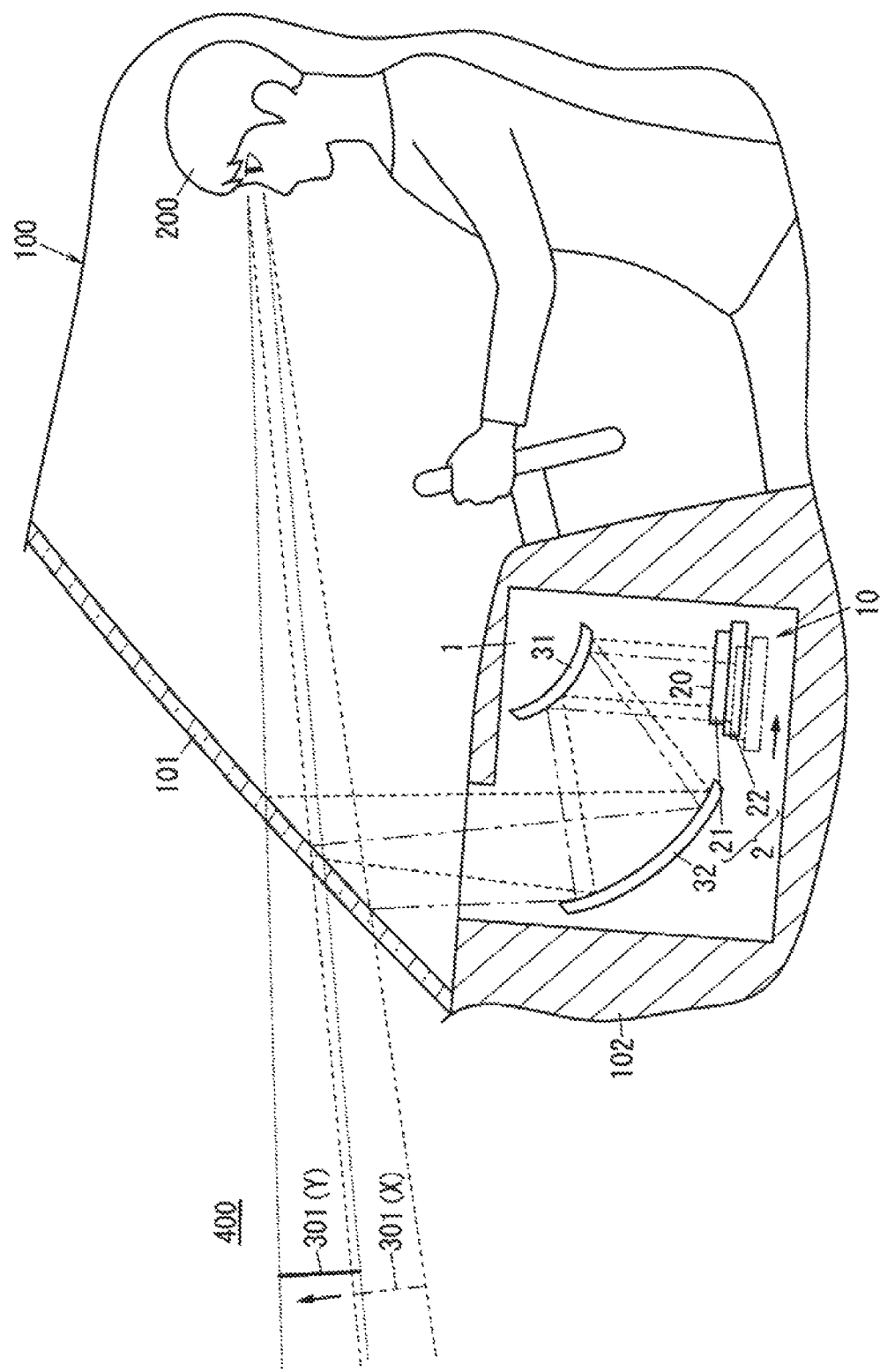
FIG. 9 is a conceptual diagram showing an operation of the second correcting unit in the above display device.

An operation of second correcting unit 42 will be described next with reference to FIGS. 8 and 9. Referring to FIGS. 8 and 9, first virtual image 301 has moved. Accordingly, "X" is suffixed to first virtual image 301 before the movement, and "Y" is suffixed to first virtual image 301 after the movement, thereby discriminating the first virtual image before the movement from that after the movement. In addition, referring to FIGS. 8 and 9, first virtual image 301(X) before the movement and first virtual image 301(Y) after the movement are shifted from each other in the depth direction along optical axis 500 (see FIG. 2) so as to be easily discriminated from each other. In practice, however, first virtual image 301 (X) and first virtual image 301(Y) undergo no change in position in the depth direction.

A case in which second correcting unit 42 controls mirror driving unit 52 to change a direction of second mirror 32 will be described first with reference to FIG. 8. As shown in FIG. 8, while second mirror 32 is set in a default direction, first virtual image 301(X) is projected on target space 400. FIG. 8 shows second mirror 32 in a default state with an imaginary line (two-dot chain line). Second correcting unit 42 controls mirror driving unit 52 to change a reflection direction of light from first mirror 31 by driving second mirror 32. With this operation, the display position of first virtual image 301(X) relative to main body unit 1 moves upward, and first virtual image 301(Y) is displayed at a position shifted upward from first virtual image 301(X) in target space 400.

Second correcting unit 42 can move the display position of first virtual image 301(X) in a direction opposite to that in the case of FIG. 8 (that is, downward) by moving second mirror 32 in a direction opposite to that in the case of FIG. 8.

A case in which second correcting unit 42 changes the position of display surface 20 by controlling module driving unit 53 will be described next with reference to FIG. 9. As shown in FIG. 9, while image forming unit 2 is at the default position, first virtual image 301(X) is projected on target space 400. FIG. 9 shows image forming unit 2 in a default state with an imaginary line (two-dot chain line). Second correcting unit 42 controls module driving unit 53 to drive image forming unit 2 and move the position of display surface 20 on display surface 20 along the longitudinal direction. With this operation, the display position of first virtual image 301(X) relative to main body unit 1 moves upward, and first virtual image 301(Y) is displayed at a position shifted upward from first virtual image 301(X) in target space 400.

Second correcting unit 42 can move the display position of first virtual image 301(X) in a direction opposite to that in the case of FIG. 9 (that is, downward) by moving image forming unit 2 in a direction opposite to that in the case of FIG. 9. In addition, referring to FIG. 9, image forming unit 2 (imaginary line) before the movement and image forming unit 2 after the movement are shifted from each other in a depth direction perpendicular to display surface 20 so as to be easily discriminated from each other. In practice, however, the position of image forming unit 2 undergoes no change in position in the depth direction.

As described above, second correcting unit 42 physically moves an optical element or display surface 20, and hence can change a projection range of output light from image forming unit 2 in target space 400 in accordance with a change in the orientation of main body unit 1. That is, second correcting unit 42 can change the display position of virtual image 300 together with display area 401 (see FIGS. 4A to 6B) where virtual image 300 can projected. Accordingly, second correcting unit 42 can project virtual image 300 on display area 401 without causing virtual image 300 to protrude from display area 401 even with a relatively large change in orientation, and hence can reduce a chance of hiding part of virtual image 300 in the visual field of user 200. This enables second correcting unit 42 to adjust the display position of virtual image 300 so as to reduce an influence of vibrations having a relatively large amplitude and a relatively low frequency.

Second correcting unit 42 changes the display position of virtual image 300 relative to main body unit 1 by changing a direction or position of an optical element (second mirror 32) or changing the position of display surface 20. Accordingly, second correcting unit 42 changes the display positions of both first virtual image 301 and second virtual image 302 relative to main body unit 1. That is, second correcting unit 42 moves virtual image 300 in target space 400 together with display area 401 (see FIGS. 4A to 6B) where virtual image 300 can be projected, and hence collectively changes the display positions of first virtual image 301 and second virtual image 302.

(4) Modification

The first exemplary embodiment is merely one of various exemplary embodiments of the present disclosure. The first exemplary embodiment can be variously modified in accordance with a design, for example, as long as the object of the present disclosure can be achieved. Furthermore, the aspect according to the first exemplary embodiment is not limited to be embodied by a display device alone. The aspect according to the first exemplary embodiment may be embodied by a system, a method for controlling a display device, a computer program, or a recording medium storing a program, for example. The modifications described below can be applied while being combined as appropriate.

Orientation detector 43 is not limited to a configuration for acquiring orientation information from an electronic control unit (ECU) of automobile 100 or the like, and may have a configuration including sensors such as an acceleration sensor and a gyro sensor and configured to detect the orientation of main body unit 1 on the basis of outputs from the sensors.

Position correcting unit 4 may include a plurality of correcting units (first correcting unit 41 and second correcting unit 42) that change the display position of virtual image 300 by respectively using different means, and may include three or more correcting units.

The filters included in position correcting unit 4 are not limited to high-pass filter 44 and low-pass filter 45. For example, position correcting unit 4 may include a bandpass filter and a clipping filter for limiting an amplitude.

It is not essential for display device 10 to project two types of virtual images 300 including first virtual image 301 and second virtual image 302 into target space 400. Display device 10 may project one type of virtual image 300 on target space 400. In addition, it is not essential for display device 10 to make virtual images 300 include an image displayed by using an augmented reality technique, such as first virtual image 301.

Details of correction by position correcting unit 4 may differ depending on a content of virtual image 300 (for example, first virtual image 301 or second virtual image 302). For example, orientation signal Si1 for execution of correction may have different frequency components between first virtual image 301 and second virtual image 302. For example, position correcting unit 4 executes display position adjustment for both first virtual image 301 and second virtual image 302 with respect to a high-frequency component, and executes display position adjustment for only first virtual image 301 with respect to a low-frequency component.

Display surface 20 may tilt relative to optical axis 500. In this case, display device 10 can project not only virtual image 300 perpendicular to road surface 600 but also virtual image 300 displayed along road surface 600. That is, display device 10 can display virtual image 300 visually recognized with a depth along road surface 600.

Position correcting unit 4 may change the display position of virtual image 300 relative to main body unit 1 in accordance with not only a change in the orientation of automobile 100 in the pitching direction but also, for example, a change in the orientation of automobile 100 in a rolling direction or yawing direction. In this case, "rolling" means rotation of automobile 100 about an axis extending through automobile 100 in a front-back direction centered on the center of gravity of automobile 100, that is, a tilt of automobile 100 in a transverse direction. In this case, "yawing" means rotation of automobile 100 about an axis extending through automobile 100 in an up-down direction centered on the center of gravity of automobile 100.

Projection unit 3 may include at least an optical element, and need not necessarily include two mirrors including first mirror 31 and second mirror 32. That is, projection unit 3 may include only one mirror or three or more mirrors. In addition, projection unit 3 may include, for example, an optical component other than a mirror, such as a lens. In this case, second correcting unit 42 (element correcting unit) may change the display position of virtual image 300 by changing a direction or position of a lens (optical element) that transmits light emitting from image forming unit 2. Projection unit 3 may or may not include a relay optical system for forming an intermediate image.

Display device 10 is not limited to the configuration for projecting virtual image 300 on target space 400 set in front of automobile 100 in a traveling direction, and may, for example, project virtual image 300 on a lateral, rear, or upper side of automobile 100 in the traveling direction.

Display device 10 is not limited to a head-up display used for automobile 100 and can be applied to moving bodies other than automobile 100, such as a motorcycle, train, aircraft, construction machine, and vessel. In addition, display device 10 may be used for, for example, amusement facilities as well as a moving body, and may be used as a wearable terminal such as a head-mounted display (HMD), medical equipment, and stationary device. Display device 10 may also be incorporated as, for example, an electronic viewfinder in equipment such as a digital camera.

Second Exemplary Embodiment

Figure 10:
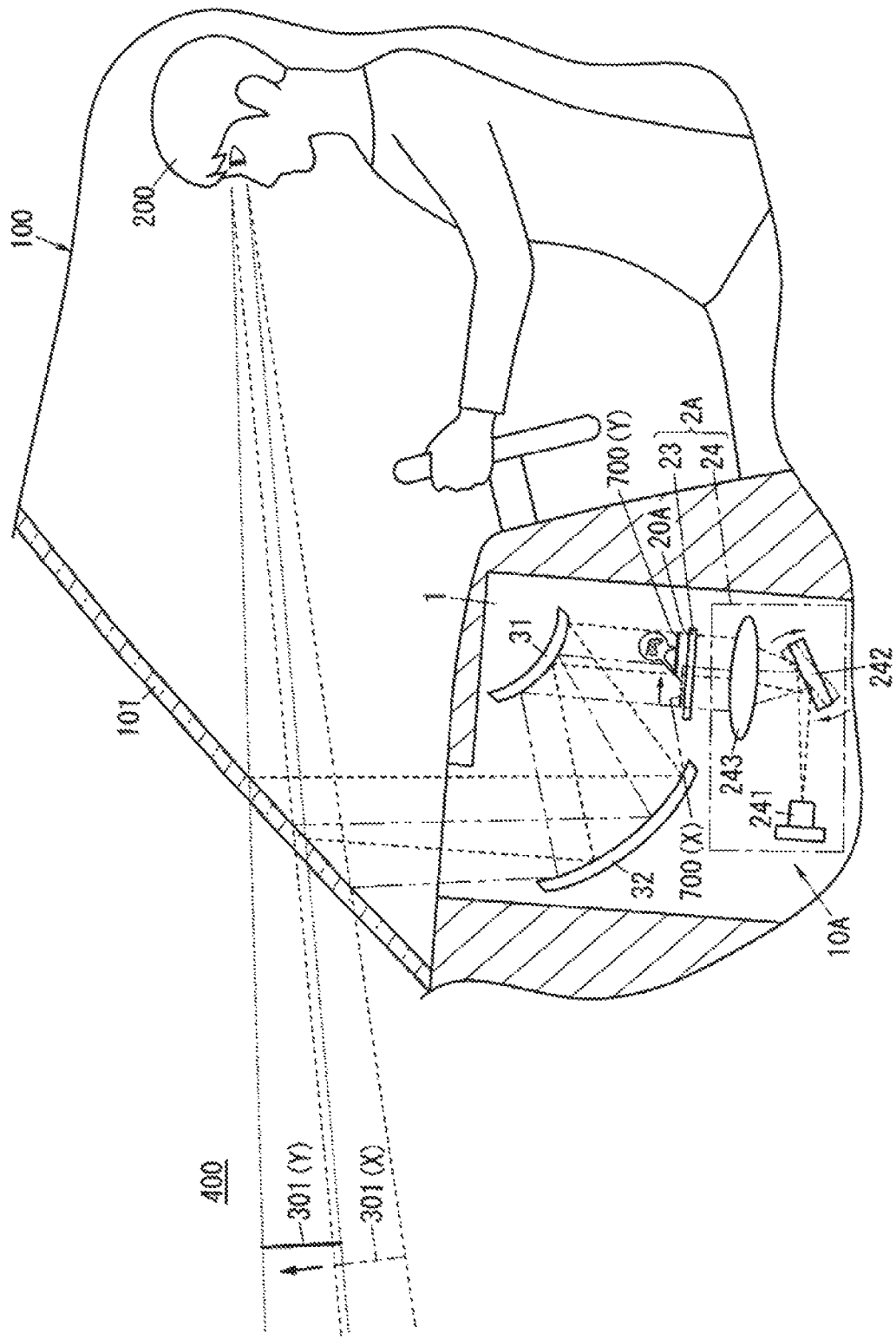
FIG. 10 is a conceptual diagram showing a configuration of a display device according to a second exemplary embodiment.

Display device 10A according to the second exemplary embodiment differs in a configuration of image forming unit 2A from display device 10 according to the first exemplary embodiment, as shown in FIG. 10. Hereinafter, common reference numerals denote the same constituent elements as those of the first exemplary embodiment, and descriptions of the constituent elements will be omitted as appropriate. Referring to FIG. 10, image 700 and first virtual image 301 have moved. Accordingly, "X" is suffixed to each of reference numerals denoting image 700 and first virtual image 301 before the movement, and "Y" is suffixed to each of reference numerals denoting image 700 and first virtual image 301 after the movement, thereby discriminating the image and the first virtual image before the movement from those after the movement. In addition, referring to FIG. 10, image 700(X) before the movement and image 700(Y) after the movement are shifted from each other in a depth direction perpendicular to display surface 20A so as to be easily discriminated from each other. Likewise, referring to FIG. 10, first virtual image 301(X) before the movement and first virtual image 301(Y) after the movement are shifted from each other in a depth direction along optical axis 500 (see FIG. 2) so as to be easily discriminated from each other. In practice, however, image 700(X) and image 700(Y) undergo no change in position in the depth direction, and first virtual image 301 (X) and first virtual image 301(Y) undergo no change in position in the depth direction.

That is, in the second exemplary embodiment, image forming unit 2A includes diffuse transmission screen 23 and irradiation unit 24 that irradiates screen 23 with light from a back of screen 23. Irradiation unit 24 is a scanning type irradiation unit, which irradiates screen 23 with light. With this configuration, image 700 is drawn on display surface 20A formed from a front surface or back surface (the front surface in this case) of screen 23 by light from irradiation unit 24, and virtual image 300 (see FIG. 2) is formed in target space 400 by light transmitted through screen 23.

Irradiation unit 24 includes light source 241 that outputs laser light, scanning unit 242 that scans light from light source 241, and lens 243. Light source 241 is formed from a laser module that outputs laser light. Scanning unit 242 irradiates screen 23 with light scanning display surface 20A by scanning light from light source 241. In this case, scanning unit 242 performs a raster scan operation of two-dimensionally scanning light in a longitudinal direction and a transverse direction of display surface 20A. That is, scanning unit 242 forms a two-dimensional image by scanning a bright spot formed on display surface 20A. Scanning unit 242 includes, for example, a micro scanning mirror using a micros-electron mechanical systems (MEMS) technique. That is, scanning unit 242 includes an optical element (mirror portion) that reflects laser light, and reflects light from light source 241 in a direction corresponding to a rotation angle (deflection angle) of the optical element by rotating the optical element. This causes scanning unit 242 to scan light from light source 241. Scanning unit 242 executes a raster scan operation of two-dimensionally scanning light by rotating the optical element about two orthogonal axes.

In display device 10A according to the second exemplary embodiment, first correcting unit 41 (see FIG. 1) changes a position of image 700 on display surface 20A, that is, a drawing position of image 700 by using light from irradiation unit 24, by controlling scanning unit 242. This causes first correcting unit 41 to function as an image correcting unit that changes a display position of virtual image 300 by changing a position of image 700 on display surface 20A. In this configuration, first correcting unit 41 changes the position of image 700 on display surface 20A without physically moving image forming unit 2A.

An operation of display device 10A according to the second exemplary embodiment will be described next.

As shown in FIG. 10, while image 700(X) is formed on display surface 20A, first virtual image 301(X) is projected on target space 400 in correspondence with image 700(X). First correcting unit 41 moves the position of image 700(X) on display surface 20A by controlling scanning unit 242, and forms image 700(Y) at a position shifted from image 700(X) on display surface 20A in a longitudinal direction of display surface 20A. With this operation, first virtual image 301(Y) is projected on target space 400 in correspondence with image 700(Y). As a result, the display position of first virtual image 301(X) relative to main body unit 1 moves upward, and first virtual image 301(Y) is displayed at a position shifted upward from first virtual image 301(X) in target space 400.

First correcting unit 41 can move the display position of first virtual image 301(X) in a direction opposite to that in the case of FIG. 10 (that is, downward) by moving the position of image 700(X) on display surface 20A in a direction opposite to that in the case of FIG. 10.

As described above, first correcting unit 41 changes the position of image 700 on display surface 20A by using scanning unit 242, and hence can respond to a change in orientation of main body unit 1 at relatively high speed and adjust the display position of virtual image 300 so as to follow up vibrations having a high-frequency component. That is, first correcting unit 41 can adjust the display position of virtual image 300 so as to reduce an influence of vibrations having a relatively small amplitude and a relatively high frequency.

First correcting unit 41 changes the display position of virtual image 300 relative to main body unit 1 by changing the position of image 700 on display surface 20A. Accordingly, first correcting unit 41 can change the display position of only first virtual image 301 of first virtual image 301 and second virtual image 302 relative to main body unit 1. First correcting unit 41 may change the display position of at least one of first virtual image 301 and second virtual image 302 relative to main body unit 1. For example, first correcting unit 41 may change the display positions of both first virtual image 301 and second virtual image 302 relative to main body unit 1. In this case, it is possible to reduce changes in the positions of first virtual image 301 and second virtual image 302 in target space 400 due to a change in the orientation of main body unit 1.

In the second exemplary embodiment, image forming unit 2A may be configured to project image 700 on diffuse transmission screen 23 from back of screen 23 by using a projector. In this case, first correcting unit 41 can change the position of image 700 on display surface 20A by controlling the projector.

The configuration of display device 10A according to the second exemplary embodiment (including the modification) can be combined with the configuration of the first exemplary embodiment (including the modification) as needed.

The drawings illustrated in each exemplary embodiment described above are merely conceptual diagrams for explaining an example of display device 10 (or 10A), and are different in shapes, sizes, positional relationships, and the like of the respective members from actual display device 10 (or 10A) as appropriate.

(Overview)

As has been described above, display device (10, 10A) according to the first aspect includes image forming unit (2, 2A), projection unit (3), main body unit (1), and position correcting unit (4). Image forming unit (2, 2A) includes display surface (20, 20A) and forms image (700) on display surface (20, 20A). Projection unit (3) projects virtual image (300) corresponding to image (700) on target space (400) by using output light from image forming unit (2, 2A). Main body unit (1) incorporates image forming unit (2, 2A) and projection unit (3). Position correcting unit (4) changes the display position of virtual image (300) relative to main body unit (1) on the basis of orientation signal (Si1) representing the orientation of main body unit (1). Position correcting unit (4) includes a plurality of correcting units (41, 42) that change the display position of virtual image (300) by using different means. Position correcting unit (4) is configured to select at least one correcting unit from the plurality of correcting units (41, 42) in accordance with a frequency component of orientation signal (Si1) and cause the selected correcting unit to change the display position of virtual image (300).

According to this configuration, the display position of virtual image (300) relative to main body unit (1) is adjusted in accordance with the orientation of main body unit (1). Accordingly, even when the orientation of main body unit (1) changes, display device (10, 10A) can, for example, superimpose and display virtual image (300) at a specific position where the virtual image should be superimposed on an actual scenery viewed from user (200). In addition, display device (10, 10A) selectively uses a plurality of correcting units (41, 42) that change the display position of virtual image (300) by using different means in accordance with a frequency component of orientation signal (Si1). Therefore, for example, even when various vibrations are exerted on main body unit (1), it is possible to change the display position of virtual image (300) by using correcting unit (41, 42) suitable for a type of vibrations (frequency component). As a result, display device (10, 10A) has an advantage of being capable of adjusting the display position of virtual image (300) in accordance with various vibrations exerted on display device (10, 10A).

In display device (10, 10A) according to the second aspect, the plurality of correcting units (41, 42) according to the first exemplary embodiment include an image correcting unit (for example, first correcting unit 41) that changes the display position of virtual image (300) by changing the position of image (700) on display surface (20, 20A). According to this configuration, the image correcting unit changes the position of image (700) on display surface (20, 20A) and hence can respond to a change in the orientation of main body unit (1) at relatively high speed.

In display device (10, 10A) according to the third aspect, position correcting unit (4) according to the second aspect is configured to select at least an image correcting unit with respect to a frequency component of orientation signal (Si1) which is more than to equal to a predetermined lower limit frequency. According to this configuration, position correcting unit (4) can change the display position of virtual image (300) by using an image correcting unit with respect to vibrations having a high-frequency component, thereby improving responsiveness with respect to a change in the display position of virtual image (300) due to vibrations having a high-frequency component.

In display device (10, 10A) according to the fourth aspect, projection unit (3) according to any one of the first to third aspects includes an optical element (for example, second mirror 32) that projects virtual image (300) on target space (400) by reflecting or transmitting output light from image forming unit (2, 2A). A plurality of correcting units (41, 42) each include an element correcting unit (for example, second correcting unit 42) that changes the display position of virtual image (300) by changing a position or direction of an optical element. This configuration enables the image correcting unit to reduce a chance of hiding part of virtual image (300) even with a relatively large change in the orientation of main body unit (1) because the image correcting unit changes a projection range of output light from image forming unit (2, 2A) on target space (400).

In display device (10, 10A) according to the fifth aspect, position correcting unit (4) according to the fourth aspect is configured to select at least an element correcting unit with respect to a frequency component of orientation signal (Si1) which is less than or equal to a predetermined upper limit frequency. According to this configuration, position correcting unit (4) can cause the element correcting unit to change the display position of virtual image (300) with respect to vibrations having a low-frequency component, thereby improving responsiveness to a change in the display position of virtual image (300) with respect to vibrations having a relatively large amplitude and a relatively low frequency.

In display device (10, 10A) according to the sixth aspect, the plurality of correcting units (41, 42) according to any one of the first to fifth aspects each include a display surface correcting unit (for example, second correcting unit 42) that changes the display position of virtual image (300) by changing a position of display surface (20, 20A). This configuration enables the display surface correcting unit to reduce a chance of hiding part of virtual image (300) even with a relatively large change in the orientation of main body unit (1) because the display surface correcting unit changes a projection range of output light from image forming unit (2, 2A) on target space (400).

In display device (10, 10A) according to the seventh aspect, position correcting unit (4) according to the sixth aspect is configured to select at least a display surface correcting unit with respect to a frequency component of orientation signal (Si1) which is less than or equal to a predetermined upper limit frequency. This configuration enables position correcting unit (4) to change the display position of virtual image (300) by using the display surface correcting unit with respect to vibrations having a low-frequency component, thereby improving responsiveness to a change in the display position of virtual image (300) with respect to vibrations having a relatively large amplitude and a relatively low frequency.

In display device (10, 10A) according to the eighth aspect, the plurality of correcting units (41, 42) according to any one of the first to seventh aspects include first correcting unit (41) and second correcting unit (42). Position correcting unit (4) further includes a first filter (for example, high-pass filter 44) and a second filter (for example, low-pass filter 45). Orientation signal (Si1) is input to first correcting unit (41) via the first filter. Orientation signal (Si1) is input to second correcting unit (42) via the second filter. This configuration enables position correcting unit (4) to passively select at least one correcting unit from the plurality of correcting units (41, 42) in accordance with a frequency component of orientation signal (Si1) via the first filter and the second filter. This can simplify the configuration of position correcting unit (4).

A moving body (for example, automobile 100) according to the ninth aspect includes display device (10, 10A) according to any one of the first to eighth aspects and a reflecting member (for example, windshield 101) that reflects light from projection unit (3).

This configuration adjusts the display position of virtual image (300) relative to main body unit (1) in accordance with an orientation of the moving body. Accordingly, even when the orientation of the moving body changes, display device (10, 10A) can, for example, superimpose and display virtual image (300) at a specific position where the image should be superimposed on an actual scenery viewed from user (200). In addition, display device (10, 10A) selectively uses a plurality of correcting units (41, 42) that change the display position of virtual image (300) by using different means in accordance with a frequency component of orientation signal (Si1). Therefore, even when, for example, various vibrations are exerted on the moving body, it is possible to change the display position of virtual image (300) by using correcting unit (41, 42) suitable for a type (frequency component) of vibrations. As a result, display device (10, 10A) has an advantage of being capable of adjusting the display position of virtual image (300) in accordance with various vibrations exerted on display device (10, 10A).

The configurations according to the second to eighth aspects are not essential configurations for display device (10, 10A) and can be omitted as appropriate.

INDUSTRIAL APPLICABILITY

The present disclosure is effective as a display device that projects virtual images on a target space and a moving body or the like having the display device.

REFERENCE MARKS IN THE DRAWINGS

1: main body unit
2, 2A: image forming unit
3: projection unit
4: position correcting unit
10, 10A: display device
20, 20A: display surface
21: liquid crystal panel
22: light source device
23: screen
24: irradiation unit
31: first mirror
32: second mirror (optical element)
321: rotation axis
41: first correcting unit (image correcting unit)
42: second correcting unit (element correcting unit, display surface correcting unit)
43: orientation detector
44: high-pass filter (HPF)
45: low-pass filter (LPF)
51: display controller
52: mirror driving unit
53: module driving unit
100: automobile
101: windshield (reflecting member)
102: dashboard
104: automobile driving unit
105: drive source
106: drive wheel
109: automobile main body unit
200: user
241: light source
242: scanning unit
243: lens
300: virtual image
301: first virtual image
302: second virtual image
400: target space
401: display area
500: optical axis
501: virtual plane
600: road surface
700: image
Si1: orientation signal

The invention claimed is:

1. A display device comprising:
an image forming unit including a display surface and that forms an image on the display surface;
a projector that forms a virtual image corresponding to the image in a target space by using output light from the image forming unit;
a main body equipped with the image forming unit and the projector; and
a position correcting unit, including a processor and a memory, that changes a display position of the virtual image relative to the main body based on an orientation signal representing an orientation of the main body,
wherein the position correcting unit includes a plurality of correcting controllers that each change the display position of the virtual image,
the position correcting unit is configured to select at least one first correcting controller from the plurality of correcting controllers for a frequency component of the orientation signal which is more than or equal to a predetermined lower limit frequency and to select at least one second correcting controller from the plurality of correcting controllers for a frequency component of the orientation signal which is less than or equal to a predetermined upper limit frequency, and
the position correcting unit is configured to cause the selected at least one correcting controller to change the display position of the virtual image.

2. The display device according to claim 1, wherein at least one correcting controller of the plurality of correcting controllers changes the display position of the virtual image by changing a position of the image on the display surface.

3. The display device according to claim 2, wherein the selected at least one first correcting controller changes the position of the image on the display surface with respect to a frequency component of the orientation signal which is more than or equal to the predetermined lower limit frequency.

4. The display device according to claim 1, wherein the projector includes an optical element that forms the virtual image in the target space by reflecting or transmitting output light from the image forming unit, and
at least one correcting controller of the plurality of correcting controllers changes the display position of the virtual image by changing a direction or position of the optical element.

5. The display device according to claim 4, wherein the selected at least one second correcting controller changes the direction or position of the optical element with respect to a frequency component of an orientation signal which is less than or equal to the predetermined upper limit frequency.

6. The display device according to claim 1, wherein at least one correcting controller of the plurality of correcting controllers changes the display position of the virtual image by changing a position of the display surface.

7. The display device according to claim 6, wherein the selected at least one second correcting controller changes the position of the display surface with respect to a frequency component of the orientation signal which is less than or equal to the predetermined upper limit frequency.

8. The display device according to claim 1, wherein
the position correcting unit further includes a first filter and a second filter, the first correcting controller receives the orientation signal via the first filter, and the second correcting controller receives the orientation signal via the second filter.

9. A moving body comprising:

a display device according to claim 1; and a reflecting member that reflects light from the projector.

10. The display device according to claim 1, wherein the position correcting unit is configured to cause both the first correcting controller and the second correcting controller as a combination to change the display position of the virtual image.

* * * * *